(12) United States Patent
Zhu et al.

(10) Patent No.: US 10,867,390 B2
(45) Date of Patent: Dec. 15, 2020

(54) COMPUTER VISION PROCESSING

(71) Applicant: Arm Limited, Cambridge (GB)

(72) Inventors: Yuhao Zhu, Rochester, NY (US); Paul Nicholas Whatmough, Cambridge, MA (US)

(73) Assignee: Arm Limited, Cambridge (GB)

( * ) Notice: Subject to any disclaimer, the term of this patent is extended or adjusted under 35 U.S.C. 154(b) by 93 days.

(21) Appl. No.: 16/127,007

(22) Filed: Sep. 10, 2018

(65) Prior Publication Data

US 2020/0082544 A1    Mar. 12, 2020

(51) Int. Cl.
| | | |
|---|---|---|
| G06T 7/20 | (2017.01) | |
| G06T 1/00 | (2006.01) | |
| G06N 3/04 | (2006.01) | |
| G06K 9/32 | (2006.01) | |

(52) U.S. Cl.
CPC ............. *G06T 7/20* (2013.01); *G06K 9/3233* (2013.01); *G06N 3/04* (2013.01); *G06T 1/0014* (2013.01); *G06T 2207/20084* (2013.01)

(58) Field of Classification Search
CPC .... G06T 7/20; G06T 7/70; G06T 7/73; G06T 17/00; G06T 1/0014; G06T 2207/20084; G06T 1/20; G06N 3/02; G06N 3/0445; G06N 3/0472; G06N 3/084; G06N 3/088; G06N 3/04; G06K 9/3233; G06K 9/6267; G06K 9/00711
See application file for complete search history.

(56) References Cited

U.S. PATENT DOCUMENTS

| | | | |
|---|---|---|---|
| 2019/0034735 A1* | 1/2019 | Cuban | .................. G06T 7/20 |
| 2019/0122082 A1* | 4/2019 | Cuban | .................. G09G 3/20 |
| 2019/0122373 A1* | 4/2019 | Natroshvili | ........ G06N 3/0445 |
| 2019/0325595 A1* | 10/2019 | Stein | .................. G06T 7/248 |

OTHER PUBLICATIONS

Nam, et al., "Learning Multi-Domain Convolutional Neural Networks for Visual Tracking," 2016 IEEE Conference on Computer Vision and Pattern Recognition (CVPR), Las Vegas, NV, USA, Jun. 27-30, 2016.
Redmon, "You Only Look Once: Unified, Real-Time Object Detection," 2016 IEEE Conference on Computer Vision and Pattern Recognition (CVPR), Las Vegas, NV, USA, Jun. 27-30, 2016.
"STV0991 Advanced HDR ISP with dedicated HW engines for video analytics and lens correction," available at: https://www.st.com/en/imaging-and-photonics-solutions/stv0991.html.

(Continued)

*Primary Examiner* — Diane D Mizrahi
(74) *Attorney, Agent, or Firm* — Vierra Magen Marcus LLP (57) ABSTRACT

A data processing apparatus detects motion between frames in a sequence of frames. The data processing apparatus then selects and/or tracks a region of interest in the sequence of frames based on the detected motion. An artificial neural network is then implemented to process image data for the selected region of interest in an attempt to classify an object within the region of interest. The data processing apparatus can provide an efficient way of performing computer vision processing.

17 Claims, 5 Drawing Sheets

(56) References Cited

OTHER PUBLICATIONS

Suleiman, et al., "Energy-Efficient HOG-based Object Detection at 1080HD 60 fps with Multi-Scale Support," Institute of Electrical and Electronics Engineers (IEEE), 2014. 1-6, available at: http://hdl.handle.net/1721.1/92823.
Suleiman, et al., "Towards Closing the Energy Gap Between HOG and CNN Features for Embedded Vision," 2017 IEEE International Symposium on Circuits and Systems (ISCAS), May 28-31, 2017.
Turner, "Next-generation automotive image processing with ARM Mali-C71," ARM Tech Forum Korea, Jun. 28, 2017.

* cited by examiner

COMPUTER VISION PROCESSING

BACKGROUND

The technology described herein relates to methods and apparatus for performing computer vision processing.

Computer vision is used in a wide variety of applications, such as augmented reality (AR), virtual reality (VR), advanced driver-assistance systems (ADAS), and surveillance. Computer vision typically includes image processing tasks, such as automatic detection and classification of objects in an image. One way of performing automatic object detection and classification is to use a trained artificial neural network both to detect the presence of objects in an image and then to classify the objects. Such artificial neural networks can provide highly accurate results. However, using artificial neural networks can be computationally expensive, for example in terms of power consumption and memory usage, which is particularly undesirable in the case of portable devices, such as mobile phones, tablet computers and laptops. This problem worsens as image resolution and frame rate requirements increase over time.

The Applicants believe that there remains scope for improvements in performing computer vision processing.

BRIEF DESCRIPTION OF THE DRAWINGS

Various embodiments of the technology described herein will be described by way of example only and with reference to the accompanying drawings, in which.

The drawings show elements of a data processing apparatus and system that are relevant to embodiments of the technology described herein. As will be appreciated by those skilled in the art, there may be other elements of the data processing apparatus and system that are not illustrated in the drawings. It should also be noted here that the drawings are only schematic, and that, for example, in practice the shown elements may share significant hardware circuits, even though they are shown schematically as separate elements in the drawings. Like reference numerals are used for like elements where appropriate in the drawings.

DETAILED DESCRIPTION

An embodiment of the technology described herein comprises a method of performing computer vision processing, the method comprising:

detecting motion between frames in a sequence of frames;

determining a region of interest in a frame of the sequence of frames based on the detected motion and indicating the region of interest for processing by an artificial neural network; and implementing the artificial neural network to process image data for the region of interest in an attempt to classify an object within the region of interest.

Another embodiment of the technology described herein comprises a data processing apparatus for performing computer vision processing, the apparatus comprising:

motion detection circuitry configured to detect motion between frames in a sequence of frames;

motion processing circuitry configured to determine a region of interest in a frame of the sequence of frames based on the detected motion and indicate the region of interest for processing by an artificial neural network; and artificial neural network circuitry configured to implement the artificial neural network to process image data for the region of interest in an attempt to classify an object within the region of interest.

As discussed above, the Applicants have recognised that artificial neural networks are often used for computer vision processing, such as object detection and classification, but that using an artificial neural network to do this can be computationally expensive. The Applicants have further recognised that objects of interest, such as people, animals and/or vehicles, typically reside within regions of frames that comprise motion. The Applicants have further recognised that the processing burden placed on an artificial neural network can be significantly reduced by performing an initial process in which a region of interest for a particular frame is determined based on detected motion between (e.g. successive or non successive) frames in a sequence of frames. Image data for the region of interest can then be processed by an artificial neural network in an attempt to classify an object within that region of interest. Thus, the artificial neural network itself does not have to perform an initial process of determining where objects of potential interest may be within a particular frame prior to attempting to classify those objects. This can, for example, help to reduce the size and/or complexity of the artificial neural network. The technology disclosed herein can therefore help to provide an efficient way of performing computer vision processing.

Furthermore, since the process of detecting regions of interest and then classifying objects within those regions are essentially separated, those processes can be separately debugged and/or optimised. For example, it can more easily be determined when an inaccurate classification is primarily due to the process of detecting a region of interest or is primarily due to the process of attempting to classify an object within that region of interest. The process that is primarily responsible for the inaccurate classification can then be refined accordingly. The technology disclosed herein can therefore help to provide a more accurate way of performing computer vision processing.

The frames in the sequence of frames may take any desired and suitable form. For example, each frame in the sequence of frames may comprise part or all of an image in a sequence of video images. Each frame may comprise an array of data elements (e.g. pixels). Each frame may comprise any desired and suitable number of data elements and/or may be any desired and suitable size and/or shape in terms of data elements. In embodiments, the frames may be rectangular (including square). The frames in the sequence of frames may all contain the same number of data elements and/or may all be the same size and/or shape in terms of data elements. Each image data element may take any desired and suitable format, such as RAW, RGB or YUV. The sequence of frames may be received, generated and/or recorded by the data processing apparatus or by another device of the overall data processing system, e.g. using a sensor and/or sensor interface of the apparatus or system. The sensor may, for example, comprise a sensor array. The sensor may, for example, comprise an electromagnetic (e.g. radar, infrared, visible, ultraviolet, x-ray, etc.) sensor. The sensor may, for example, comprise a camera sensor array.

The region of interest of the frame may also take any desired and suitable form. For example, the region of interest of the frame may comprise an array of data elements (e.g. pixels). The region of interest of the frame may comprise any desired and suitable number of data elements and/or may be any desired and suitable size and/or shape in terms of data elements. In embodiments, the region of interest may be rectangular (including square). In embodiments, the region of interest may have fewer data elements and/or may be smaller in terms of data elements than the frame of the sequence of frames. Plural regions of interest may be determined for a particular frame and/or sequence of frames. In these embodiments, some or all of the plural regions of interest may contain the same number of data elements and/or may be the same size and/or shape in terms of data elements, and/or some or all of the plural regions of interest may contain different numbers of data elements and/or may be different sizes and/or shapes in terms of data elements.

In embodiments, the artificial neural network may take any desired and suitable form or "network topology". The artificial neural network may, for example, comprise one or more fully connected networks including one or more activation layers, such as an input layer that receives an input (e.g. the image data (data elements) for the region of interest), one or more intermediate or "hidden" layers, and an output layer that provides a result (e.g. indicating a classification of an object).

An (and e.g. each) activation layer may comprise one or more (e.g. plural) activation nodes that each apply an activation function, such as a Sigmoid, Rectified Linear Unit (ReLU) or Scaled Exponential Linear Unit (SELU) function and/or apply a bias. One or more activation nodes (e.g. each activation node) of an activation layer may be connected to one or more nodes (e.g. each activation node) of another (e.g. the next) layer, and so on, by a respective interconnection. A (e.g. respective) weight value may be applied to a (and e.g. each) value provided on the input side of an interconnection to produce a weighted value on the output side of the interconnection. One or more (e.g. summed and/or weighted and/or biased) values may be provided as an input to an activation function that is applied at an activation node.

In embodiments, the artificial neural network may also or instead comprise a convolutional neural network, for example having one or more convolutional layers (e.g. that each apply one or more convolution operations to generate an output for the layer), one or more pooling layers (e.g. that each pool or aggregate sets of input values to generate an output from the layer), and/or one or more fully connected networks (e.g. comprising one or more activation layers as discussed above).

In embodiments, detecting the motion between the frames in the sequence of frames can be performed in any desired and suitable way. However, as will be appreciated, in embodiments, detecting the motion between the frames in the sequence of frames may not comprise implementing an artificial neural network. As discussed above, this can help to reduce the processing burden placed on the data processing system, e.g. by reducing the size and/or complexity of the artificial neural network.

In embodiments, detecting motion between the frames in the sequence of frames may comprise performing motion estimation in respect of the frames in the sequence of frames. In this regard, the Applicants have identified that many forms of data processing apparatus, e.g. portable devices, often already comprise processing circuitry configured to perform and/or use motion estimation, e.g. when encoding and/or decoding sequences of frames. The Applicants have further identified that this processing circuitry can be reused for the purpose of detecting motion between frames in a sequence of frames, prior to then determining a region of interest in a frame of the sequence of frames based on that detected motion. Embodiments can accordingly make efficient reuse of existing encoding and/or decoding processing circuitry of a data processing apparatus. For example, in some embodiments, the process of detecting the motion between the frames in the sequence of frames may form part of a process of encoding and/or decoding the sequence of frames, e.g. with the detected motion being a by-product of that process. However, in other embodiments, the process of detecting motion between frames in the sequence of frames may not form part of a process of encoding and/or decoding the sequence of frames, but nevertheless may still make efficient reuse of the existing encoding and/or decoding processing circuitry of the data processing apparatus.

In embodiments, performing motion estimation in respect of the sequence of frames can be performed in any desired and suitable way. For example, performing motion estimation in respect of the sequence of frames may comprise subdividing a (and e.g. each) particular frame of the sequence of frames into plural blocks of data elements. The blocks may take any desired and suitable form. For example, the blocks may comprise an array of data elements (e.g. pixels). The blocks may comprise any desired and suitable number of data elements and/or may be any desired and suitable size and/or shape in terms of data elements. In embodiments, the blocks may be rectangular (including square). In embodiments, the blocks may all contain the same number of data elements and/or may all be the same size and/or shape in terms of data elements.

These embodiment may then comprise determining, for a (and e.g. each) particular block of data elements of the particular frame of the sequence of frames, a similar (e.g. the most similar) block of data elements in a previous frame or subsequent frame of the sequence of frames. This may comprise performing a search within a search window of the previous frame or subsequent frame to determine a similar (e.g. the most similar) block of data elements in that previous frame or subsequent frame of the sequence of frames. The position of the search window within the previous frame or subsequent frame of the sequence of frames may correspond to (overlap) the position of the particular block within the particular frame in question. The size of the search window (e.g. in terms of number of data elements) may be larger than the particular block and/or smaller than the frame, but otherwise may be selected as desired.

These embodiments may then comprise providing a motion vector that points from the similar block of data elements to the particular block of data elements, or vice versa. Thus, performing motion estimation in respect of the sequence of frames may comprise generating motion vectors for the frame of the sequence of frames. The Applicants have identified that this can provide an efficient and effective way to quantify the amounts of motion across the frame.

However, in other embodiments, detecting motion between frames in the sequence of frames can be performed in other ways. For example, detecting motion between frames in the sequence of frames may comprise performing a cross-correlation of a particular frame of the sequence of frames with a previous frame or subsequent frame of the sequence of frames. Other ways of detecting the motion between the frames in the sequence of frames can be used as desired.

In embodiments, determining the region of interest in a frame of the sequence of frames based on the detected motion can be performed in any desired and suitable way. However, as will be appreciated, in embodiments, determining the region of interest in a frame of the sequence of frames based on the detected motion may comprise not implementing an artificial neural network. As discussed above, this can help to reduce the processing burden placed on the data processing system, e.g. by reducing the size and/or complexity of the artificial neural network.

In embodiments, detecting motion between frames in the sequence of frames may comprise detecting amounts of motion for the frame of the sequence of frames. Determining the region of interest in the frame of the sequence of frames based on the detected motion may then comprise selecting the region of interest in the frame of the sequence of frames based on the detected amounts of motion for the frame. In this regard, the Applicants have identified that objects of interest, such as people, animals and/or vehicles, typically reside within areas of frames that comprise relatively greater amounts of motion.

In embodiments (e.g. in which the field of view of the sequence of frames is substantially static, such as for frames captured by a sensor device that is substantially fixed), the region of interest in the frame of the sequence of frames may be selected when that region is determined as comprising a relatively greater amount of motion (e.g. when compared with the rest of the frame) and/or more than a threshold amount of motion. In other embodiments (e.g. in which the field of view of the sequence of frames is not substantially static, such as for frames captured by a sensor device that is moving, rotating, panning and/or zooming), the region of interest in the frame of the sequence of frames may be selected when that region is determined as comprising a relatively greater amount of motion (e.g. when compared with the rest of the frame) and/or more than a threshold amount of motion or alternatively may be selected when that region is determined as comprising a relatively lesser amount of motion (e.g. when compared with the rest of the frame) and/or less than a threshold amount of motion.

In any of these embodiments, the threshold amount(s) of motion can be set as desired. In embodiments (e.g. in which the field of view of the sequence of frames is substantially static), the threshold amount of motion may be substantially zero motion or zero motion plus an offset. In other embodiments (e.g. in which the field of view of the sequence of frames is not substantially static), the threshold amount(s) of motion may be based on an average amount of motion for the frame, such as the average amount of motion plus and/or minus an offset. In yet other embodiments (e.g. in which the field of view of the sequence of frames is not substantially static), the threshold amount(s) of motion may be specific to the position of the data element or block of data elements in question. For example, the threshold amount(s) of motion may be based on the expected amount of motion for that data element or block of data elements in the absence of a moving object, such as the expected amount of motion plus and/or minus an offset. The expected amount of motion for that data element or block of data elements may, for example, be derived from an output from a movement sensor (e.g. accelerometer) for the sensor device that provides the sequence of frames.

In embodiments, the amount of motion for a region may be determined from the magnitude of one or more motion vectors for that region. A region having one or more motion vectors of relatively greater magnitude may be determined as having a relatively greater amount of motion, and vice versa. In other embodiments, the amount of motion detected for a region may be determined from the degree of cross correlation of that region with a corresponding (e.g. in terms of position within the frame) region of a previous or subsequent frame of the sequence of frames. A region having relatively lesser degree of correlation may be determined as having a relatively greater amount of motion, and vice versa.

In any of these embodiments, selecting a region of interest in the frame of the sequence of frames based on the detected amounts of motion may comprise grouping together one or more (e.g. adjacent) data elements or blocks of data elements that meet one or more criteria for an amount of motion, for example as discussed above. A region of interest may accordingly comprise a group of data elements or blocks of data elements that meet one or more criteria for an amount of motion.

As will be appreciated, depending on the desired size and/or shape of the region of interest (e.g. rectangular) and the distribution of motion across the frame, the region of interest may also comprise one or more data elements or blocks of data elements that do not meet the one or more criteria for the amount of motion, but which are nevertheless still included within the region of interest so as to provide a region of interest having the desired size and/or shape. Similarly, depending on the desired size and/or shape of the region of interest (e.g. rectangular) and the distribution of motion across the frame, the region of interest may not comprise one or more data elements or blocks of data elements that do meet the one or more criteria for the amount of motion, but which are nevertheless not included within the region of interest so as to provide a region of interest having the desired size and/or shape.

In one or more other frames of the sequence of frames, it may be the case that no suitable regions of interest are found, e.g. because that other frame of the sequence of frames comprises no motion or insufficient amounts of motion. In these cases, embodiments may comprise determining that there are no regions of interest in that other frame of the sequence of frames based on the detected motion and/or not indicating any regions of interest for processing by an artificial neural network in respect of that frame. Embodiments may then comprise not implementing an artificial neural network to process the image data for that other frame of the sequence of frames. This can further help to reduce the processing burden placed on the data processing apparatus by avoiding the need to implement an artificial neural network in respect of a frame that is determined as including no motion or insufficient amounts of motion.

In embodiments, the motion detection circuitry may comprise any desired and suitable circuitry. For example, the motion detection circuitry may comprise motion estimation circuitry configured to detect motion between frames in the sequence of frames, for example in a manner as discussed above. The motion detection circuitry may, for example, receive a (and e.g. each) frame of the sequence of frames and/or output a set (e.g. array) of one or more motion vectors for a (and e.g. each) frame of the sequence of frames. The motion processing circuitry may also comprise any desired and suitable circuitry. The motion processing circuitry may, for example, receive a set of motion vectors for a (and e.g. each) frame of the sequence of frames and/or indicate one or more regions of interest for one or more of those frames.

In embodiments, detecting motion between frames in the sequence of frames may further comprise detecting directions of motion. The method may further comprise tracking the position of the region of interest between frames of the sequence of frames based on a detected direction of motion for the region of interest. Thus, the data processing apparatus may further comprise tracking circuitry configured to track the position of the region of interest between frames of the sequence of frames based on a detected direction of motion for the region of interest. In this regard, the Applicants have identified that tracking the position of the region of interest between frames of the sequence of frames can provide a further opportunity to reduce the amount of processing required in respect of one or more frames. For example, embodiments may comprise, whilst tracking the position of the region of interest between frames of the sequence of frames, not implementing an artificial neural network to process image data for a region of interest in an attempt to classify an object within the region of interest. Thus, embodiments may comprise, whilst tracking the region of interest between frames of the sequence of frames, not implementing an artificial neural network to process image data for the sequence of frames. These embodiments can, therefore, reduce or avoid the need to implement an artificial neural network in respect of each and every frame.

Indeed, embodiments in which the position of a region of interest is tracked between frames of a sequence of frames based on a detected direction of motion for the region of interest are considered to be new and advantageous in their own right, and not merely in the context of the other embodiments described herein.

Thus, another embodiment of the technology described herein comprises a method of performing computer vision processing, the method comprising:

detecting motion between frames in a sequence of frames, wherein detecting motion between frames in the sequence of frames comprises detecting directions of motion; and tracking the position of a region of interest between frames of the sequence of frames based on a detected direction of motion for the region of interest.

Similarly, another embodiment of the technology described herein comprises a data processing apparatus for performing computer vision processing, the apparatus comprising:

motion detection circuitry configured to:

detect motion between frames in a sequence of frames, wherein detecting motion between frames in the sequence of frames comprises detecting directions of motion; and tracking circuitry configured to:

track the position of a region of interest between frames of the sequence of frames based on a detected direction of motion for the region of interest.

These embodiments can comprise one or more or all of the features of any of the other embodiments described herein as appropriate. For example, detecting motion between the frames in the sequence of frames may comprise performing motion estimation in respect of the frames in the sequence of frames, for example in a manner as discussed above. The direction of motion for the region of interest may then be indicated by a direction of one or more motion vectors for that region of interest. For example, the direction of motion for the region of interest may be indicated by (e.g. an average of the directions of) one or more motion vectors for that region.

Similarly, embodiments may comprise detecting motion between frames in the sequence of frames and then determining (and indicating) the region of interest in a frame of the sequence of frames based on the detected motion, for example in a manner as discussed above. In these embodiments, detecting motion between frames in the sequence of frames may comprise detecting amounts of motion for the frame of the sequence of frames, for example in a manner as discussed above. Determining the region of interest in the frame of the sequence of frames based on the detected motion may then comprise selecting the region of interest in the frame of the sequence of frames based on the detected amounts of motion for the frame, for example in a manner as discussed above. These embodiments may then comprise detecting directions of motion and tracking the position of the region of interest between frames of the sequence of frames based on the detected direction of motion for the region of interest.

However, other embodiments may comprise initially implementing an artificial neural network to process image data for the (e.g. whole) frame to select a region of interest. Thus, in these embodiments, an artificial neural network may be implemented that is operable to process image data for a (e.g. whole) frame in an attempt to select a region of interest. These embodiments may then comprise detecting directions of motion and tracking the position of the region of interest between frames of the sequence of frames based on the detected direction of motion for the region of interest. In these other embodiments, implementing the artificial neural network to process the image data for the frame may also attempt to classify an object within the region of interest. Thus, in these embodiments, an artificial neural network may be implemented that is (in addition to being operable to select a region of interest) operable to process image data for a frame in an attempt to classify an object within the region of interest. This classification of the object may be associated with the region of interest and may remain associated with the region of interest while the region of interest is tracked.

As indicated above, any of the embodiments described herein may comprise, whilst tracking the position of the region of interest between frames of the sequence of frames, not implementing an artificial neural network to process image data for the region of interest in an attempt to classify an object within the region of interest. Thus, any of the embodiments described herein may comprise, whilst tracking the region of interest between frames of the sequence of frames, not implementing an artificial neural network to process image data for the sequence of frames.

However, embodiments may still comprise, whilst tracking the position of the region of interest between frames of the sequence of frames, continuing to detect motion between frames in the sequence of frames, e.g. so that one or more regions of interest can continue to be tracked, to allow one or more new regions of interest (e.g. for one or more new objects that have started moving or have entered the field of view covered by the sequence of frames) to be selected and tracked, and/or to allow one or more regions of interest (e.g. for one or more objects that are no longer in the field of view covered by the sequence of frames) to be deselected and no longer tracked.

Embodiments may therefore comprise detecting motion between frames in the sequence of frames and then determining (and indicating) a new region of interest in a subsequent frame of the sequence of frames based on the detected motion, for example in a manner as discussed above. In these embodiments, detecting motion between frames in the sequence of frames may again comprise detecting amounts of motion for the subsequent frame of the sequence of frames. Determining the new region of interest in the subsequent frame of the sequence of frames based on the detected motion may then comprise selecting the new region of interest in the subsequent frame of the sequence of frames based on the detected amounts of motion for the subsequent frame, for example in a manner as discussed above. These embodiments may then comprise detecting directions of motion and tracking the position of the new region of interest between frames of the sequence of frames based on the detected direction of motion for the new region of interest.

Any of the embodiments described herein may further comprise, having tracked the position of one or more regions of interest between a number of frames of the sequence of frames based on the detected direction of motion, implementing an artificial neural network to process image data for the one or more regions of interest in an attempt to classify (e.g. to initially classify, to confirm a previous classification of, or to reclassify) an object within one or more regions of interest, for example in a manner as discussed above. Again, the classification of an object may remain associated with a region of interest while the region of interest is (further) tracked.

Any of the embodiments described herein may also or instead further comprise, having tracked the position of one or more regions of interest between a number of frames of the sequence of frames based on the detected direction of motion, implementing an artificial neural network to process image data for the (e.g. whole) frame in an attempt to select one or more new regions of interest and/or in an attempt to classify (e.g., to initially classify, to confirm a previous classification of, or to reclassify) an object within one or more regions of interest, for example in a manner as discussed above. Again, the classification of an object may remain associated with a region of interest while the region of interest is (further) tracked.

The number of frames over which one or more regions of interest are tracked before implementing an artificial neural network may be selected as desired. In some embodiments, the number of frames over which one or more regions of interest are tracked before implementing an artificial neural network may vary. For example, an artificial neural network may be implemented in response to a threshold amount of motion being detected and/or in response to one or more new regions of interest being selected, e.g. so as to classify any new objects that have recently started moving or have recently entered the field of view covered by the sequence of frames.

In some embodiments, the (e.g. maximum) number of frames over which one or more regions of interest are tracked before implementing an artificial neural network may be substantially fixed. This can allow the artificial neural network to be predictably periodically implemented, e.g. so as to classify and/or select any new objects that have recently started moving or have recently entered the field of view covered by the sequence of frames and/or so as to confirm the classification of or reclassify any previously classified objects which may now be more visible within the field of view covered by the sequence of frames. The alternating processes of tracking the position of one or more regions of interest and then implementing an artificial neural network to process image data for one or more regions of interest may be repeated as many times as desired.

In any of the embodiments described herein, implementing an artificial neural network to process the image data for the region of interest in an attempt to classify an object within the region of interest may comprise the artificial neural network processing some but not all of the image data (e.g. data elements) for the frame. In this regard, the Applicants have identified that processing some but not all of the image data for the frame can further help to reduce the processing burden placed on the data processing apparatus by reducing the amount of image data that needs to be considered by the artificial neural network.

This may be achieved in any desired and suitable way. For example, embodiments may comprise the artificial neural network receiving some but not all of the image data (e.g. data elements) for the frame for processing. The artificial neural network may, for example, receive image data (e.g. data elements) for an area of the frame comprising (e.g. only) the region of interest. However, other embodiments may comprise the artificial neural network receiving image data (e.g. data elements) for substantially the entire frame.

In any of these embodiments, the artificial neural network processing circuitry may also receive the indication of the region of interest. The indication of the region of interest may, for example, indicate the position of the region of interest within the area or frame and/or the extent (e.g. height and/or width) of the region of interest. The indication of the position and/or the extent of the region of interest may comprise, for example, one or more sets of coordinates (e.g. indicating one or more locations within the area or frame) and/or one or more dimensions (e.g. in terms of data elements).

In any of the embodiments described herein, implementing the artificial neural network to process the image data for the region of interest in an attempt to classify an object within the region of interest may further comprise implementing plural different artificial neural networks to process the image data for the region of interest in an attempt to classify an object within the region of interest. In this regard, the Applicants have identified that, since the process of detecting regions of interest and then classifying objects within those regions are essentially separated, the image data for the region of interest can be received by plural different artificial neural networks and those plural different artificial neural networks can be used (and e.g. optimised) for different types of classification, such as body pose classification, facial recognition, etc. This then removes the need to train a single artificial neural network to be able to provide plural different types of classification.

In embodiments, the classification of an object within the region of interest may be used for any desired and suable purpose. Embodiments may, for example, comprise outputting the classification of an object, e.g. for display on a display device and/or for control purposes. For example, embodiments may comprise indicating the classification of an object to a user of the data processing apparatus or a user of another device, such as a machine or a vehicle, that is in communication with the data processing apparatus. Embodiments may also or instead comprise using the classification of an object to control the operation of the data processing apparatus or another device, such as a machine or a vehicle, that is in communication with the data processing apparatus.

The data processing apparatus described herein may, for example, be part of a virtual reality (VR) system and/or augmented reality (AR) system. In these embodiments, the system may, for example, comprise one or more VR and/or AR displays, headsets, sensors, etc. The data processing apparatus described herein may also or instead be part of an advanced driver assistance system (ADAS). In these embodiments, the system may, for example, comprise one or more displays, sensors, controllers, actuators, etc., for (e.g. assisting) vehicle control.

In embodiments, image data for one or more frames of the sequence of frames or portions thereof may also be output, e.g. for display on a display device. For example, a region of interest or its frame may be output, e.g. for display on a display device. In these embodiments, image data (e.g. data elements) for a portion of the frame comprising (e.g. only) the region of interest may be output, e.g. for display on a display device. However, in other embodiments, image data (e.g. data elements) for substantially the whole frame comprising the region of interest may be output, e.g. for display on a display device.

In any of these embodiments, the location of the region of interest within the frame may be indicated, e.g. with one or more graphical indications, such as lines and/or shading, overlaid on the frame. A processor (e.g. central processor, graphics processor, etc.) of the data processing system may be used to render the one or more graphical indications for the region of interest in question. A processor (e.g. central processor, graphics processor, display controller, etc.) of the data processing system may be used to overlay the one or more graphical indications on the frame in question.

As will be appreciated, one or more or all of the features and/or processes described herein that are performed in respect of a frame of the sequence of frames may be provided and/or performed in respect of each one of plural frames of the sequence of frames. Similarly, one or more or all of the features and/or processes described herein that are provided and/or performed in respect of a region of interest may be provided and/or performed in respect of each one of plural regions of interest determined for one or more frames of the sequence of frames. Similarly, one or more or all of the features and/or processes described herein that are performed in respect of an object within a region of interest may be provided and/or performed in respect of each one of plural objects within the region of interest. Thus, one or more or all of the features and/or processes described herein may be provided and/or performed plural times during a sequence of frames.

The processing described herein in any embodiment may be performed by any desired and suitable data processing apparatus and/or part thereof. For example, at least some of the processing described herein may be performed by a central processor (CPU), a graphics processor (GPU), a display controller, an image signal processor (ISP), a (dedicated) tracking processor and/or a (dedicated) artificial neural network processor. The data processing apparatus may therefore comprise or may be a central processor (CPU), a graphics processor (GPU), a display controller, an image signal processor (ISP), a (dedicated) tracking processor and/or a (dedicated) artificial neural network processor. Thus, at least some of the processing circuitry described herein may form part of a central processor (CPU), a graphics processor (GPU), a display controller, an image signal processor (ISP), a (dedicated) tracking processor and/or a (dedicated) artificial neural network processor.

The data processing apparatus may comprise, or may be, or may form part of, a system on chip (SoC) or a distributed (multi-chip) system. In an embodiment, the various functions of the technology described herein are carried out on a single data processing platform.

As will be appreciated, the data processing apparatus described herein may be part of an overall data processing system that includes, for example, a host (e.g. central) processor, memory(ies), sensor(s), display device(s), etc. The host processor may, for example, execute applications that require data processing by the data processing apparatus. The host processor may send appropriate commands and data to control the data processing apparatus to perform computer vision processing and to generate and/or use the results of the computer vision processing as required by applications executing on the host processor. To facilitate this, the host processor may execute one or more drivers for the data processing apparatus and/or may execute one or more compilers for compiling programs to be executed by one or more programmable execution units of the data processing apparatus.

In embodiments, the apparatus may comprise a data storage device (memory) controller configured to read in and/or write back the data described herein (e.g. the sequence of frames, the motion vectors, the indications of the regions of interest, etc.) from and/or to a data storage device (memory). The data storage device (memory) may be any desired and suitable storage device of or for the data processing apparatus. The data storage device (memory) may be external to the one or more processors of or for the data processing apparatus, such as a central processor (CPU), a graphics processor (GPU), a display controller, an image signal processor (ISP), a (dedicated) tracking processor and/or a (dedicated) artificial neural network processor. The data storage device (memory) may be external to the data processing apparatus. The data storage device (memory) may be, for example, main system memory.

In embodiments, the apparatus or system may comprise, and/or may be in communication with, one or more memories and/or memory devices that store the data described herein, and/or store software for performing the processes described herein. The apparatus or system may comprise, and/or may be in communication with a display controller and/or a display for displaying an (e.g. rendered) output (e.g. all or part of a frame or a sequence of frames) based on the data processing described herein.

The technology described herein can be implemented in any suitable apparatus or system, such as a suitably configured computer or micro-processor based apparatus or system. In an embodiment, the technology described herein is implemented in a computer and/or micro-processor based apparatus or system.

The various functions of the technology described herein can be carried out in any desired and suitable manner. For example, the steps and functions of the technology described herein can be implemented in hardware or software, as desired. Thus, for example, unless otherwise indicated, the various circuitry, functional elements, stages, and "means" of the technology described herein may comprise a suitable processor or processors, controller or controllers, functional units, circuitry, processing logic, microprocessor arrangements, etc., that are operable to perform the various steps or functions, etc., such as appropriately dedicated hardware elements (processing circuitry) and/or programmable hardware elements (processing circuitry) that can be programmed to operate in the desired manner.

The various steps or functions, etc., of the technology described herein may be duplicated and/or carried out in parallel on a given processor. Equally, the various processing stages may share processing circuitry, etc., if desired.

Subject to any hardware necessary to carry out the specific steps or functions, etc., discussed above, the apparatus or system can otherwise include any one or more or all of the usual functional units, etc., that data processing apparatus or systems include.

The various data processing stages can be implemented as desired and in any suitable manner, and can perform any desired and suitable functions, respectively. Similarly, the various data can be defined and stored in any suitable and desired manner.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software, e.g. computer programs. Thus, further embodiments comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processor. The data processor may be a microprocessor system, a programmable FPGA (field programmable gate array), etc.

The technology described herein also extends to a computer software carrier comprising such software which when used to operate a data processing apparatus, data processor, renderer or microprocessor system comprising a data processor causes in conjunction with said data processor said apparatus, processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus further embodiments comprise computer software and such software installed on a computer software carrier for carrying out at least one of the steps of the methods set out herein.

The technology described herein may suitably be embodied as a computer program product for use with a computer system. Such an implementation may comprise a series of computer readable instructions either fixed on a tangible, non transitory medium, such as a computer readable medium, for example, diskette, CD, DVD, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

Figure 1:
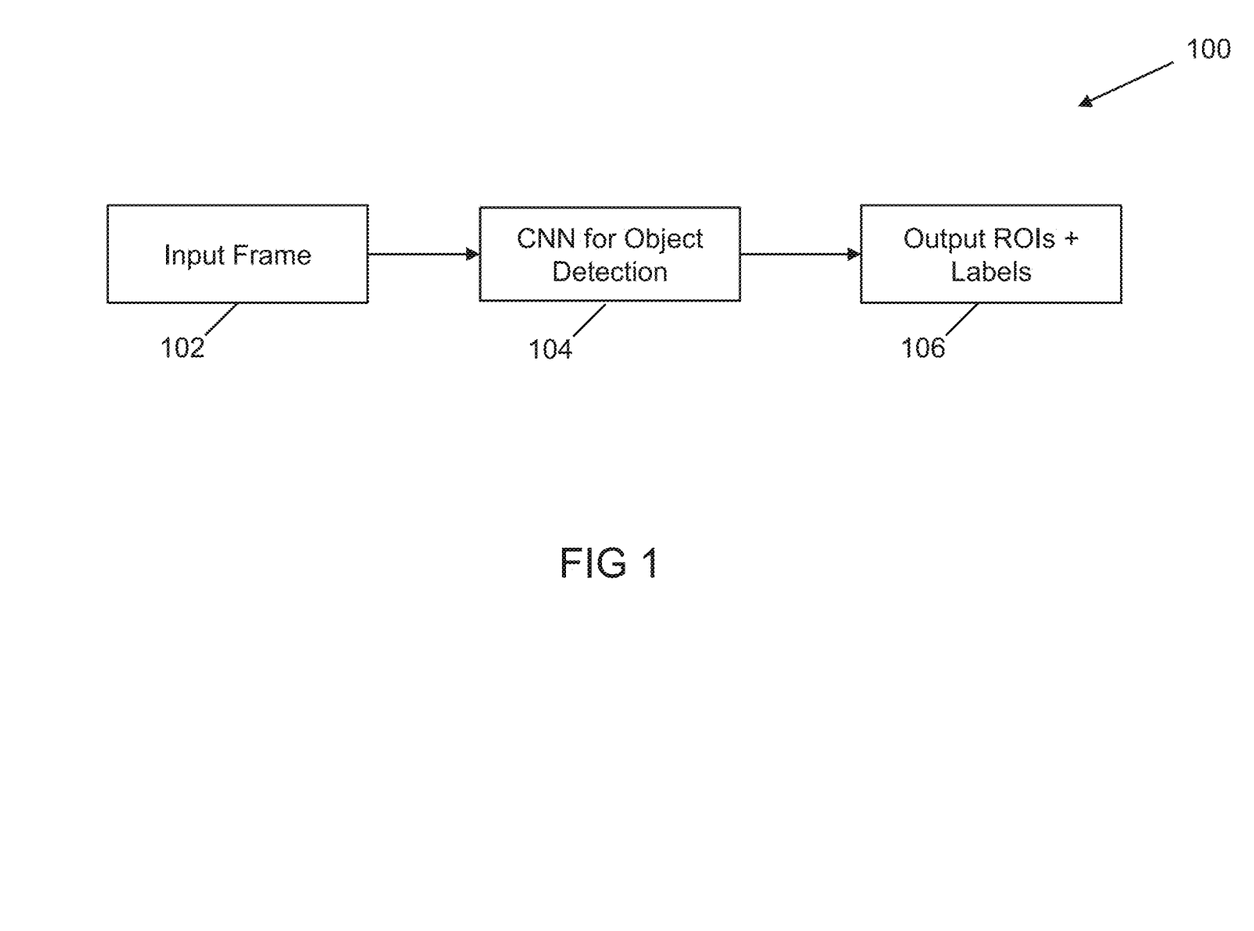
FIG. 1 shows a conventional method of performing object detection and classification.

In order to better illustrate the benefits of embodiments of the technology described herein, FIG. 1 shows a conventional method 100 of performing object detection and classification. In this conventional example, in step 102, an input frame is received. Then, in step 104, a convolutional neural network (CNN) processes the input frame in an attempt both to identify regions of interest in that frame that contain potential objects of interest and then to classify those objects. Then, in step 106, the convolutional neural network outputs any regions of interest (ROIs) and classification labels for any objects found. As is discussed above, using an artificial neural network both to detect the presence of objects in an image and to then classify the objects in this way can be computationally expensive and inefficient.

In contrast to this conventional method, as is discussed above, embodiments of the technology described herein instead relate to arrangements in which a data processing apparatus detects motion between frames in a sequence of frames. The data processing apparatus then selects and/or tracks a region of interest in the sequence of frames based on the detected motion. Image data for the selected and/or tracked region of interest can then be input to an artificial neural network. The artificial neural network can then be implemented to process the image data for the selected region of interest in an attempt to classify an object within that region of interest. As is discussed above, the data processing apparatus can provide a more efficient way of performing computer vision processing.

Various embodiments of the technology described herein will now be described with reference to FIGS. 2-5.

Figure 2:
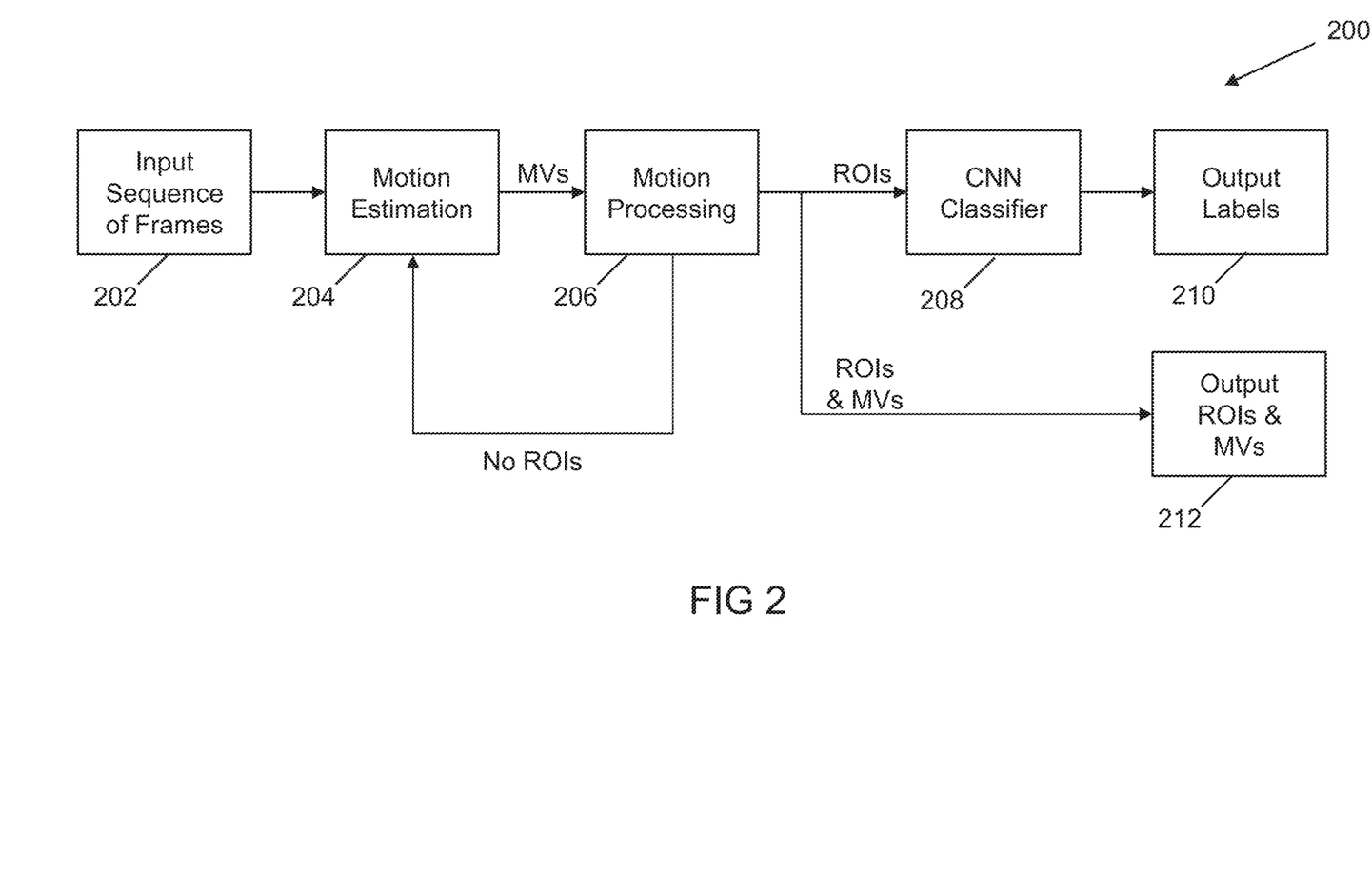
FIG. 2 shows a method of determining regions of interest and performing object classification according to an embodiment of the technology described herein.

FIG. 2 shows a method 200 of determining regions of interest and performing object classification according to an embodiment of the technology described herein.

In this embodiment, in step 202, an input sequence of frames is received frame by frame. Then, in step 204, motion estimation is performed to detect motion between frames in the sequence of frames. In this embodiment, the motion estimation comprises subdividing each frame of the sequence of frames into plural blocks of data elements. A search is then performed to determine, for each particular block of data elements of each particular frame of the sequence of frames, the most similar block of data elements within a search window of a previous frame of the sequence of frames. A motion vector is then provided that points from the similar block of the previous frame to the particular block of the particular frame.

In other embodiments, a search may be performed to determine, for each particular block of data elements of each particular frame of the sequence of frames, the most similar block of data elements within a search window of a subsequent frame of the sequence of frames. In these embodiments, a motion vector may then be provided that points from the particular block of the particular frame to the similar block of the subsequent frame.

Then, in step 206, the motion vectors (MVs) are processed to determine one or more regions of interest in the particular frame. In this embodiment, this motion processing comprises grouping together adjacent blocks of data elements having motion vectors of at least a threshold magnitude and providing, for each group of blocks, a region of interest that comprises those blocks that have been grouped together. Any regions of interest are then indicated. However, if no suitable regions of interest are determined for the particular frame, then no regions of interest are indicated in respect of that particular frame and the process returns to consider the next particular frame in the sequence. This can, for example, potentially avoid the need to process some of the frames using an artificial neural network.

Then, in step 208, image data (a set of data elements) for each region of interest is input to a convolutional neural network classifier (CNN classifier) that processes the image data for the region of interest in an attempt to classify any objects in that region of interest. In this embodiment, only the image data (set of data elements) for the regions of interest is input to the CNN classifier. However, in other embodiments, a larger area of the frame (e.g. some or all of the whole frame) that comprises the region of interest in question may be input to the CNN classifier and an indication of the location and/or extent of the region of interest to be processed may be provided to the artificial neural network processing circuitry. In either case, the CNN classifier then only needs to process the image data for regions already determined to be of interest. Thus, the processing burden placed on the artificial neural network processing circuitry of the apparatus can be reduced.

Then, in step 210, the convolutional neural network outputs classification labels for any objects found. Also, in step 212, indications of any regions of interest (ROIs) and motion vectors (MVs) are also output for other purposes, such as for use when rendering graphical indications for the regions of interest, for tracking regions of interest between frames, and/or for use when debugging the motion estimation and/or motion processing steps.

Figure 3:
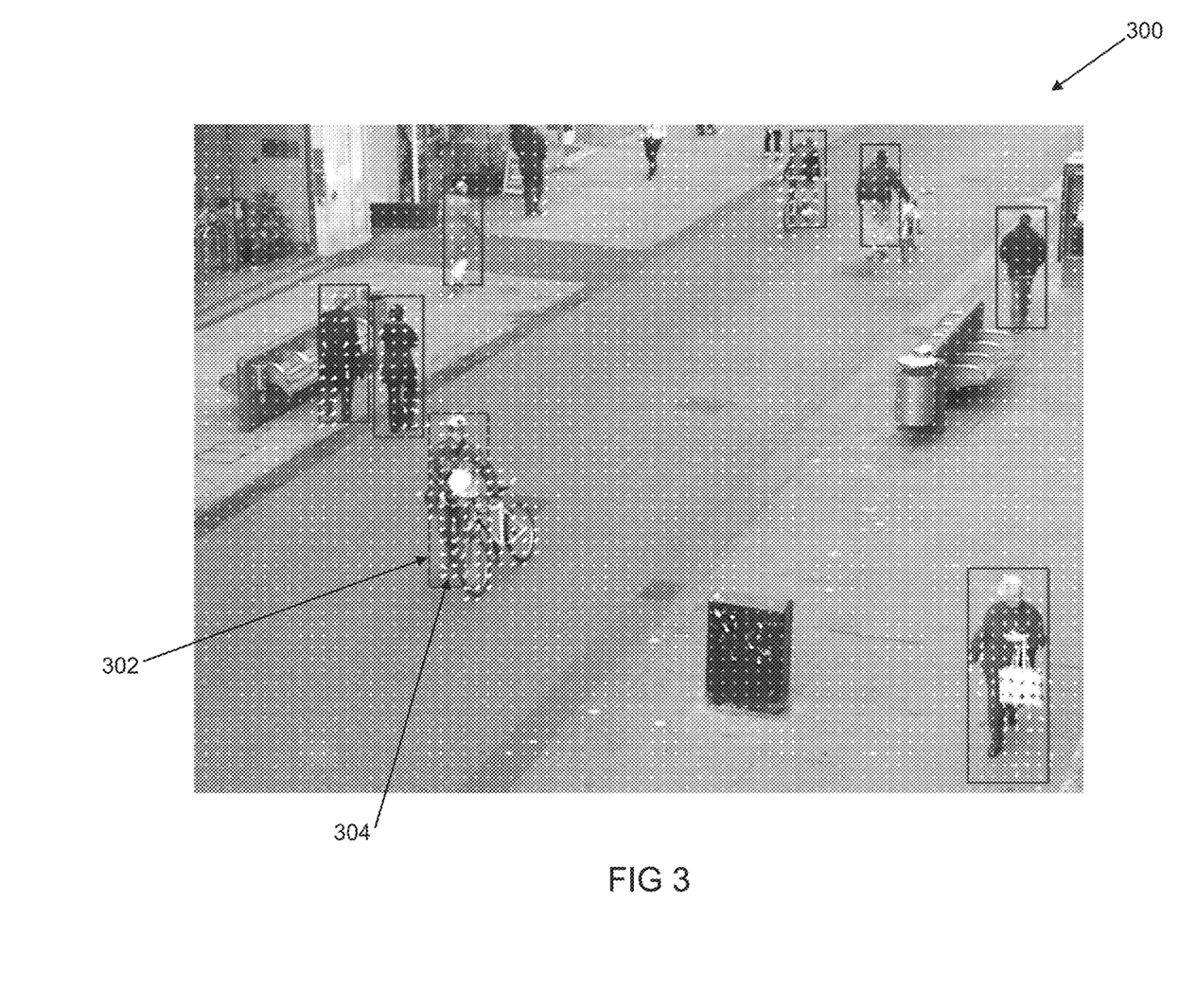
FIG. 3 shows an example image frame for which motion vectors have been generated using motion estimation and for which several regions of interest have been determined using motion processing according to an embodiment of the technology described herein.

FIG. 3 shows an example image frame 300 for which motion vectors of various magnitudes (shown with white arrows of various lengths) have been generated using motion estimation and for which several regions of interest have been determined using motion processing according to an embodiment of the technology described herein.

In total, FIG. 3 shows eight regions of interest that have been selected based on the detected amount of motion for the frame. For example, as is shown in FIG. 3, the region of interest 302 has been selected since that region contains blocks of data elements having motion vectors 304 with at least a threshold magnitude.

Figure 4:
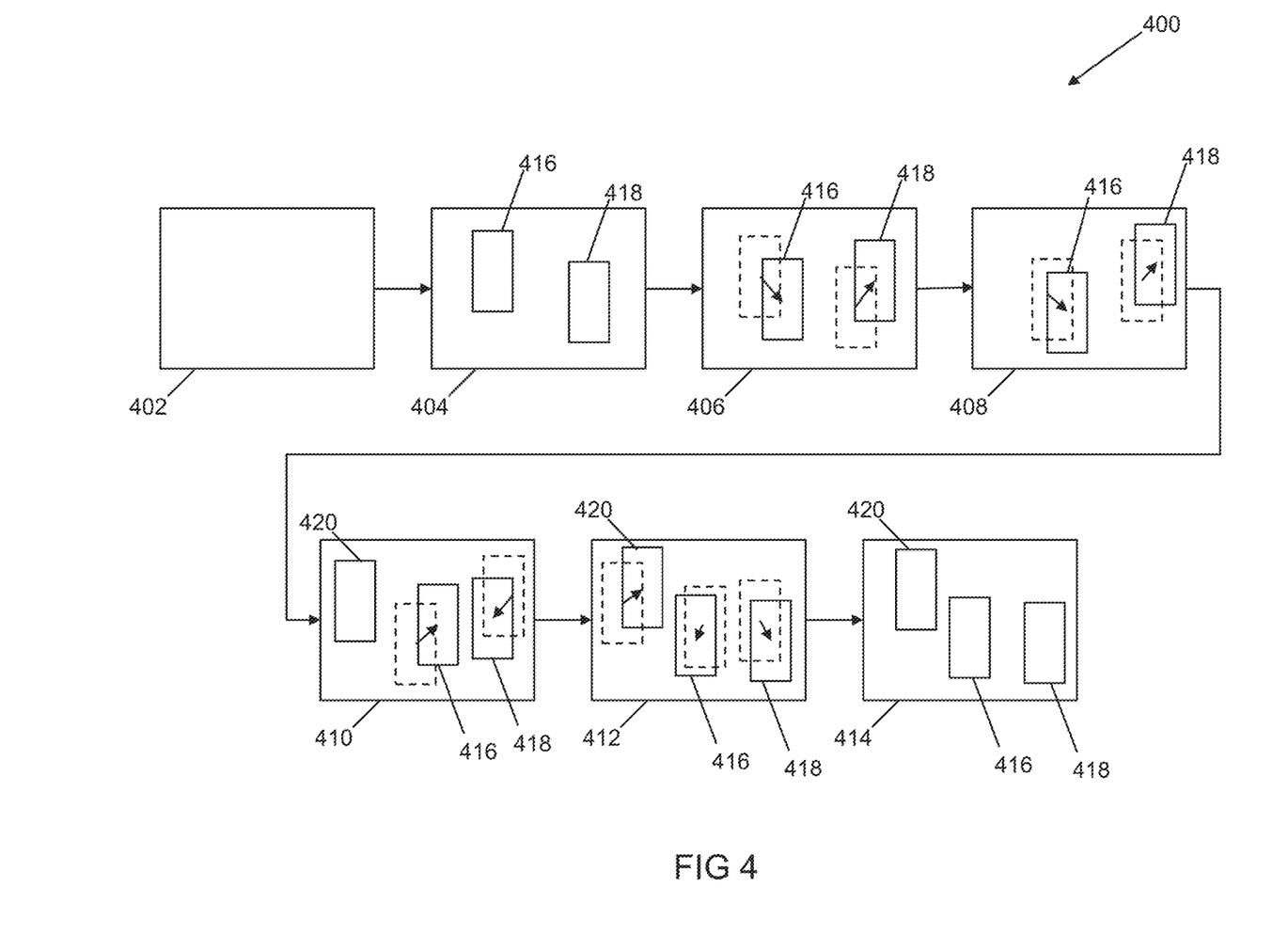
FIG. 4 illustrates a method of determining regions of interest, tracking regions of interest and performing object classification for a sequence of frames according to an embodiment of the technology described herein.

FIG. 4 illustrates a method 400 of determining regions of interest, tracking regions of interest and performing object classification for a sequence of frames 402-414 according to an embodiment of the technology described herein.

In a first frame 402 of the sequence, no motion is detected. Thus, no regions of interest are determined and an artificial neural network is not implemented. As discussed above, this can avoid the need to process that particular frame using an artificial neural network. Thus, the processing burden placed on the data processing apparatus in respect of this first frame 402 is very low.

Then, in a second frame 404 of the sequence, motion is detected between the first and second frames, and a first region of interest 416 and second region of interest 418 are selected based on the detected motion between the first and second frames. In this embodiment, an artificial neural network is also implemented at this stage, but only in respect of the image data for the first and second regions of interest in an attempt to classify any objects within those regions. The classifications for any objects in those regions of interest can then remain associated with those regions as they are subsequently tracked.

In this embodiment, implementing an artificial neural network in respect of the image data for the first and second regions of interest only, helps to reduce the processing burden placed on the data processing apparatus in respect of this second frame 404. Furthermore, in other embodiments, the implementation of an artificial neural network in respect of the image data for the first and second regions of interest may be deferred for a number of frames to further reduce the processing burden placed on the data processing apparatus in respect of this second frame 404.

Then, in a third frame 406 of the sequence, motion between the second and third frames is detected using motion estimation and the direction of motion for the respective first and second regions of interest is determined by averaging the motion vectors for those respective regions. As is shown in FIG. 4, the respective positions of the first and second regions of interest are accordingly tracked to respective new positions. This process allows the movement of objects within regions of interest and their associated classifications to be tracked, but places only a negligible burden on the data processing system in respect of this third frame 406.

Then, in a fourth frame 408 of the sequence, motion between the third and fourth frames is again detected using motion estimation, and the direction of motion for the respective first and second regions of interest is determined by averaging the motion vectors for those respective regions. As is shown in FIG. 4, the respective positions of the first and second regions of interest are again accordingly tracked to respective new positions. Again, this process allows the movement of objects within regions of interest and their associated classifications to be tracked, but places only a negligible burden on the data processing system in respect of this fourth frame 408.

Then, in a fifth frame 410 of the sequence, motion between the fourth and fifth frames is again detected using motion estimation, and the direction of motion for the respective first and second regions of interest is determined by averaging the motion vectors for those respective regions. As is shown in FIG. 4, the respective positions of the first and second regions of interest are again accordingly tracked to respective new positions.

Also, in this fifth frame 410, a new third region of interest 420 is selected based on the detected motion between the fourth and fifth frames. In this embodiment, an artificial neural network is also implemented at this stage, but only in respect of the image data for the third region of interest 420 in an attempt to classify any objects within that third region of interest 420. The classifications for any objects in the third region of interest 420 can then remain associated with that region as it is subsequently tracked.

In this embodiment, implementing an artificial neural network in respect of the image data for the third region of interest 420 only, again helps to reduce the processing burden placed on the data processing apparatus in respect of this fifth frame 410. However, in other embodiments, an artificial neural network may also be (re)implemented at this stage in respect of the image data for the first and second regions of interest in an attempt to confirm the classification of, or reclassify, any objects within those regions of interest. This would not significantly increase the processing burden placed on the data processing apparatus in respect of this fifth frame 410. Any new classifications for objects in the regions of interest can then remain associated with those regions as they are subsequently tracked. In yet other embodiments, the implementation of an artificial neural network in respect of some or all of the regions of interest may again be deferred for a number of frames to further reduce the processing burden placed on the data processing apparatus in respect of this fifth frame 410.

Then, in a sixth frame 412 of the sequence, motion between the fifth and sixth frames is again detected using motion estimation, and the direction of motion for the respective first, second and third regions of interest is determined by averaging the motion vectors for those respective regions. As is shown in FIG. 4, the respective positions of the first, second and third regions of interest are again accordingly tracked to respective new positions. Again, this process allows the movement of objects within regions of interest and their associated classifications to be tracked, but places only a negligible burden on the data processing system in respect of this sixth frame 412.

Then, in a seventh frame 414 of the sequence, despite no new regions of interest being selected and no detected motion, an artificial neural network is implemented in respect of the first, second and third regions of interest in an attempt to classify, confirm classification of, or reclassify any objects within those regions of interest. Any new classifications for objects in the regions of interest can remain associated with those regions as they are subsequently tracked. This process of periodically implementing an artificial neural network in respect of the regions of interest, regardless of whether or not any new regions of interest are selected and/or regardless of there being any detected motion, can help to confirm or improve the accuracy of the classifications.

Figure 5:
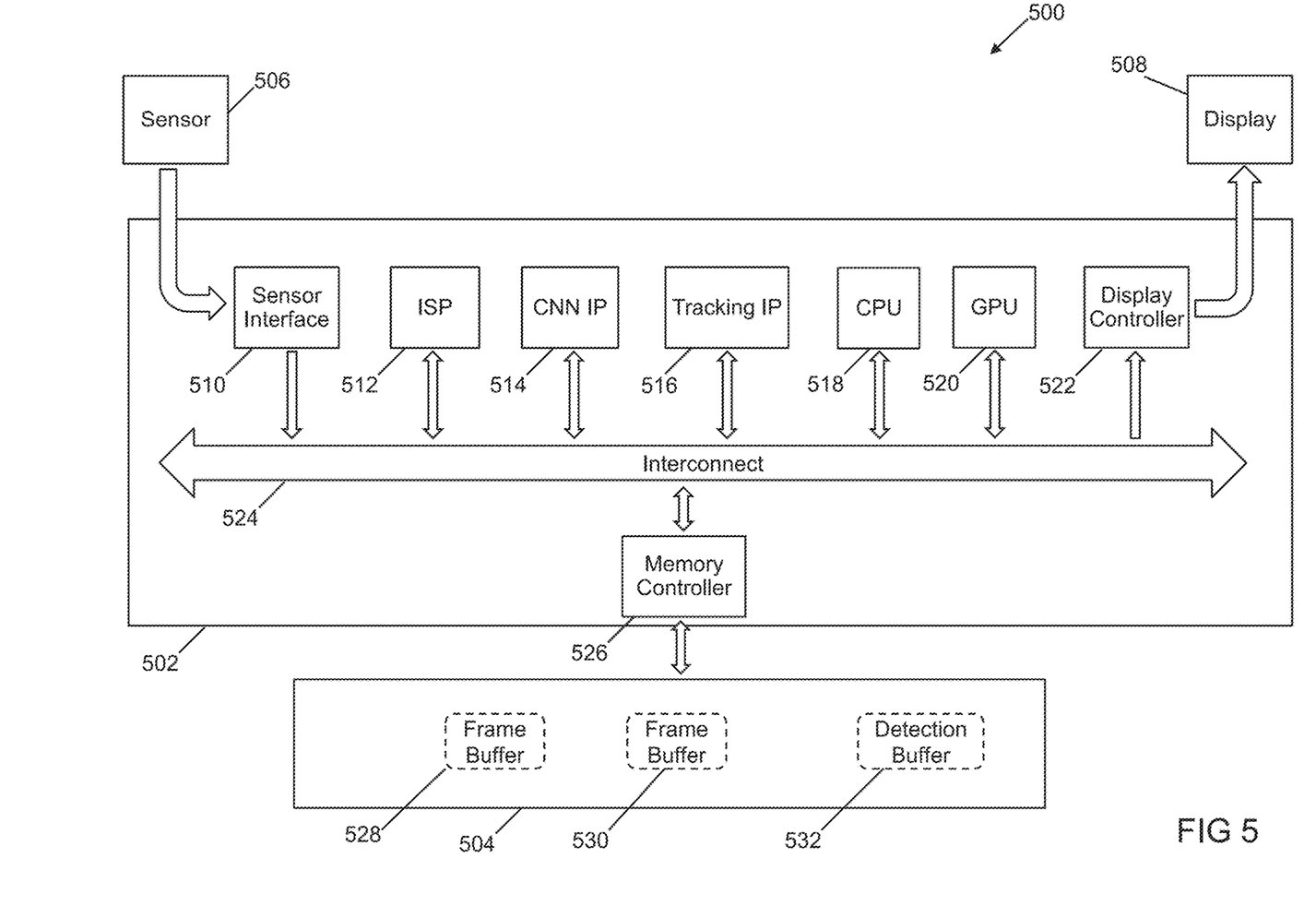
FIG. 5 shows schematically a data processing system comprising a data processing apparatus for determining regions of interest, tracking regions of interest and performing object classification for a sequence of frames according to an embodiment of the technology described herein.

FIG. 5 shows schematically a data processing system 500 comprising a data processing apparatus 504 for determining regions of interest, tracking regions of interest and performing object classification for a sequence of frames according to an embodiment of the technology described herein.

In this embodiment, the system 500 comprises a data processing apparatus 502 in the form of a system on chip (SoC). The system 500 also comprises a data storage device in the form of off-chip (main) memory 504, a sensor in the form of a camera sensor array 506 and a display device 508.

The SoC 502 comprises a sensor interface 510, an image signal processor (ISP) 512, a convolutional neural network processor (CNN IP) 514, a tracking processor (Tracking IP) 516, a central processing unit (CPU) 518, a graphics processing unit (GPU) 520, a display controller 522, an AXI interconnect 524 and a memory controller 526.

As is shown in FIG. 5, the sensor interface 510, ISP 512, CNN IP 514, tracking processor 516, CPU 518, GPU 520 and display controller 522 communicate with each other via the interconnect 524 and with the memory 504 via the interconnect 524 and memory controller 526. The SoC 502 also communicates with the camera sensor array 506 via the sensor interface 510 and with the display device 508 via the display controller 522. In this embodiment, the overall operation of the SoC 502 is controlled by the CPU 518.

In operation, the camera sensor array 506 is controlled, via the sensor interface 510, to capture a sequence of video frames. The sequence of video frames is received, e.g. in RAW, RGB or YUV format, by the sensor interface 510 and is stored, via the interconnect 524 and memory controller 526, in a first frame buffer 528 of the memory 504.

The ISP 512 is operable to read in, via the memory controller 526 and interconnect 524, the sequence of video frames from the first frame buffer 528 of the memory 504. The ISP 512 is further operable to perform an encoding process on the sequence of video frames and to store, via the interconnect 524 and memory controller 526, the encoded sequence of video frames in a second frame buffer 530 of the memory 504.

As part of the encoding process, the ISP 512 is operable to perform motion estimation and, in doing so, can determine a set of motion vectors for each frame as discussed above. The set of motion vectors for a frame can then be stored with the (possibly encoded) frame in the second frame buffer 530 of the memory 504.

In this embodiment, the ISP 512 is also operable to perform motion processing using a set of motion vectors for a frame in order to select any regions of interest for that frame as discussed above. However, other processing circuitry (e.g. the CPU 518) could perform this motion processing.

The CNN IP 514 is operable to read in, via the memory controller 526 and interconnect 524, image data for a region of interest for a frame from the second frame buffer 530 of the memory 504. The CNN IP 514 can then implement an artificial neural network to process the image data for that region of interest in an attempt to classify one or more objects in that region as discussed above.

The CNN IP 514 also associates the region of interest with its one or more object classifications and then outputs an indication of the region of interest and its associated classifications. In this embodiment, an indication of a region of interest and its associated classifications can be stored, via the memory controller 526 and interconnect 524, in a detection buffer 532 of the memory.

The tracking processor 516 is operable to receive, via the interconnect 524, an indication of a region of interest for a previous frame and its associated classifications. The tracking processor 516 can also read in, via the memory controller 526 and interconnect 524, the set of motion vectors for a current frame. The tracking processor 516 can then predict the position of that region of interest in the current frame by extrapolation using the motion vectors as discussed above. The tracking processor 516 can then output an updated indication of the newly positioned region of interest and its associated classifications. In this embodiment, an updated indication of the newly positioned region of interest and its associated classifications can again be stored, via the memory controller 526 and interconnect 524, in the detection buffer 532 of the memory 504.

The regions of interest and their associated classifications can then be used as desired. In this embodiment, the GPU 520 is operable to generate rendered outputs for display and store the rendered outputs in the memory 504. For example, the GPU 520 may render graphical indicators, such as lines that demarcate regions of interest and/or classification indicators (e.g. labels), to be overlaid on the frames for display.

The display controller 522 is then operable to read in the rendered outputs stored in the memory 504, and use the rendered outputs to generate output frames for display on the display device 508. In this embodiment, this involves the display controller 522 compositing one or more layers of rendered graphical indicators and video frames.

In other embodiments, the region of interest and its associated classifications can be used, e.g. by the CPU 518, to control the operation of the data processing apparatus or another device, such as a computer vision controlled machine or vehicle, that is in communication with the data processing apparatus.

Other arrangements for the data processing system 500 and apparatus 502 would, of course, be possible. For example, one or more or all of the above processes that are performed by the processing circuitry of a particular processor may be performed by the processing circuitry of one or more other processors as appropriate.

It can be seen from the above that embodiments of the technology described herein can provide an efficient way of performing computer vision processing. This is achieved in embodiments of the technology described herein by detecting motion between frames in a sequence of frames. A region of interest in a frame of the sequence of frames is then selected and/or tracked based on the detected motion. The artificial neural network can then be implemented to process image data for the selected region of interest in an attempt to classify an object within the region of interest.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of performing computer vision processing, the method comprising:
   detecting motion between a first frame and a second frame in a sequence of frames, wherein detecting motion between the first frame and the second frame in the sequence of frames comprises detecting amounts of motion for the second frame of the sequence of frames;
   determining a region of interest in the second frame of the sequence of frames based on the detected motion between the first frame and the second frame, wherein determining the region of interest in the second frame of the sequence of frames based on the detected motion comprises selecting the region of interest in the second frame of the sequence of frames based on the detected amounts of motion for the second frame;
   indicating the region of interest for processing by an artificial neural network; and
   implementing the artificial neural network to process the image data for the region of interest in an attempt to classify an object within the region of interest.

2. A method as claimed in claim 1, wherein:
   detecting motion between the first frame and the second frame in the sequence of frames comprises performing motion estimation in respect of the frames in the sequence of frames.

3. A method as claimed in claim 1, wherein:
   detecting motion between the first frame and the second frame in the sequence of frames comprises detecting directions of motion;
   the method further comprising tracking the position of the region of interest between frames of the sequence of frames based on a detected direction of motion for the region of interest.

4. A method as claimed in claim 1, wherein:
   implementing the artificial neural network to process the image data for the region of interest in an attempt to classify an object within the region of interest comprises the artificial neural network processing some but not all of the image data for the second frame.

5. A method as claimed in claim 1, further comprising:
   the artificial neural network receiving some but not all of the image data for the second frame for processing.

6. A method as claimed in claim 1, wherein:
   implementing the artificial neural network to process the image data for the region of interest in an attempt to classify an object within the region of interest comprises implementing plural different artificial neural networks to process the image data for the region of interest in an attempt to classify an object within the region of interest.

7. A method as claimed in claim 1, further comprising:
   indicating the classification of the object to a user of a data processing apparatus or a user of another device that is in communication with the data processing apparatus.

8. A method as claimed in claim 1, further comprising:
   using the classification of the object to control the operation of a data processing apparatus or another device that is in communication with the data processing apparatus.

9. A data processing apparatus for performing computer vision processing, the apparatus comprising:
   motion detection circuitry configured to detect motion between a first and a second frame in a sequence of frames, wherein the motion detection circuitry is configured to, when detecting motion between the first frame and the second frame in the sequence of frames, detect amounts of motion for the second frame of the sequence of frames;
   motion processing circuitry configured to determine a region of interest in the second frame of the sequence of frames based on the detected motion between the first frame and the second frame, wherein the motion processing circuitry is configured to, when determining the region of interest in the second frame of the sequence of frames based on the detected motion, select the region of interest in the second frame of the sequence of frames based on the detected amounts of motion for the second frame; and
   indicate the region of interest for processing by an artificial neural network; and
   artificial neural network circuitry configured to implement the artificial neural network to process the image data for the region of interest in an attempt to classify an object within the region of interest.

10. An apparatus as claimed in claim 9, wherein:
    the motion detection circuitry is configured to, when detecting motion between the first frame and the second frame in the sequence of frames, perform motion estimation in respect of the frames in the sequence of frames.

11. An apparatus as claimed in claim 9, wherein:
    the motion detection circuitry is configured to, when detecting motion between the first and the second frame in the sequence of frames, detect directions of motion;
    the apparatus further comprising tracking circuitry configured to:
    track the position of the region of interest between frames of the sequence of frames based on a detected direction of motion for the region of interest.

12. An apparatus as claimed in claim 9, wherein:
    the artificial neural network circuitry is configured to, when implementing the artificial neural network to process the image data for the region of interest in an attempt to classify an object within the region of interest, process some but not all of the image data for the second frame.

13. An apparatus as claimed in claim 9, wherein:
the artificial neural network circuitry is configured to receive some but not all of the image data for the second frame for processing.

14. An apparatus as claimed in claim 9, wherein:
the artificial neural network circuitry is configured to, when implementing the artificial neural network to process the image data for the region of interest in an attempt to classify an object within the region of interest, implement plural different artificial neural networks to process the image data for the region of interest in an attempt to classify an object within the region of interest.

15. An apparatus as claimed in claim 9, further comprising:
output circuitry configured to indicate the classification of the object to a user of the data processing apparatus or a user of another device that is in communication with the data processing apparatus.

16. An apparatus as claimed in claim 9, further comprising:
control circuitry configured to use the classification of the object to control the operation of the data processing apparatus or another device that is in communication with the data processing apparatus.

17. A non-transitory computer readable storage medium storing computer software code which, when executing on one or more processors of a data processing apparatus, performs a method of performing computer vision processing, the method comprising:
detecting motion between a first frame and a second frame in a sequence of frames, wherein detecting motion between the first frame and the second frame in the sequence of frames comprises detecting amounts of motion for the second frame of the sequence of frames;
determining a region of interest in the second frame of the sequence of frames based on the detected motion between the first frame and the second frame, wherein determining the region of interest in the second frame of the sequence of frames based on the detected motion comprises selecting the region of interest in the second frame of the sequence of frames based on the detected amounts of motion for the second frame;
indicating the region of interest for processing by an artificial neural network; and
implementing the artificial neural network to process the image data for the region of interest in an attempt to classify an object within the region of interest.

* * * * *